(12) United States Patent
Chiba et al.

(10) Patent No.: US 10,330,198 B2
(45) Date of Patent: Jun. 25, 2019

(54) MULTI-PIECE OIL RING

(71) Applicant: NIPPON PISTON RING CO., LTD., Saitama-shi, Saitama (JP)

(72) Inventors: Atsushi Chiba, Saitama (JP); Kazuhiro Fujimura, Saitama (JP); Iwao Hiraishi, Saitama (JP); Makoto Kajiwara, Saitama (JP)

(73) Assignee: NIPPON PISTON RING CO., LTD., Saitama-shi, Saitama (JP)

( * ) Notice: Subject to any disclaimer, the term of this patent is extended or adjusted under 35 U.S.C. 154(b) by 0 days.

(21) Appl. No.: 16/015,987

(22) Filed: Jun. 22, 2018

(65) Prior Publication Data

US 2018/0363778 A1  Dec. 20, 2018

Related U.S. Application Data (63) Continuation of application No. 13/497,417, filed as application No. PCT/JP2010/055462 on Mar. 26, 2010, now Pat. No. 10,030,772.

(30) Foreign Application Priority Data

Sep. 30, 2009  (JP) ................................. 2009-228757

(51) Int. Cl.
  *F16J 9/06* (2006.01)
  *F16J 9/20* (2006.01)
  *F02F 5/00* (2006.01)

(52) U.S. Cl.
  CPC .............. *F16J 9/206* (2013.01); *F16J 9/062* (2013.01)

(58) Field of Classification Search
  CPC .................... F16J 9/206; F16J 9/062
  (Continued)

(56) References Cited

U.S. PATENT DOCUMENTS 2,715,556 A   8/1955   Prasse
2,905,512 A   9/1959   Anderson
(Continued)

FOREIGN PATENT DOCUMENTS

JP   04078375   3/1992
JP   5-87366    11/1993
(Continued)

OTHER PUBLICATIONS

International Search Report, PCT/JP2010/055462, dated Jun. 29, 2010.

*Primary Examiner* — Vishal A Patel
*Assistant Examiner* — Stacy N Lawson
(74) *Attorney, Agent, or Firm* — Muncy, Geissler, Olds & Lowe, P.C.

(57) ABSTRACT

A multi-piece oil ring includes an oil ring main member in which two rails are connected together by a columnar part and which has a roughly I-shaped cross section; and a coil expander disposed in an inner circumferential groove formed on the inner circumferential surface of the columnar. Each rail in the oil ring main member possesses a sliding section protuberance whose tip possesses a jutting portion. The axial length of the jutting portion is 0.02-0.18 mm. The change rate of the axial length of the individual jutting portion is in the range of 0 to 80% at least in a region of from its sliding surface to be faced to a cylinder, which is positioned at the tip of the jutting portion, to a position of 0.03 mm away from the aforementioned sliding surface in the radial direction of the oil ring main member.

9 Claims, 6 Drawing Sheets

(58) Field of Classification Search
USPC .......... 277/440–444, 449–455, 435, 472
See application file for complete search history.

(56) References Cited

U.S. PATENT DOCUMENTS

| | | | |
|---|---|---|---|
| 3,435,502 A * | 4/1969 | Morgan ............ | B23P 15/08 277/442 |
| 5,295,696 A | 3/1994 | Harayama | |
| 5,820,131 A | 10/1998 | Tanaka | |
| 6,655,697 B2 | 12/2003 | Heraud | |
| 7,117,594 B2 | 10/2006 | Preyer | |
| 7,252,292 B2 | 8/2007 | Panelli et al. | |
| 2002/0070507 A1 | 6/2002 | Heraud | |
| 2002/0190476 A1 | 12/2002 | Preyer | |
| 2004/0119242 A1 | 6/2004 | Katumaru | |
| 2004/0232623 A1 | 11/2004 | Panelli | |
| 2005/0184466 A1 | 8/2005 | Yoshida | |
| 2006/0006604 A1 | 1/2006 | Abe | |
| 2006/0081126 A1 | 4/2006 | Yamada | |
| 2006/0113730 A1 | 6/2006 | Suzuki | |

FOREIGN PATENT DOCUMENTS

| | | |
|---|---|---|
| JP | 9-144881 | 6/1997 |
| JP | 2002-310001 A | 10/2002 |
| JP | 2003-520931 | 7/2003 |
| JP | 2004-526926 | 9/2004 |
| WO | 2004/040174 | 5/2004 |

* cited by examiner

Fig. 7
Comparative Art

MULTI-PIECE OIL RING

CROSS REFERENCE TO RELATED APPLICATIONS

This application is a continuation application of the U.S. patent application Ser. No. 13/497,417 filed Mar. 21, 2012, which is a national stage application of International Application No.: PCT/JP2010/055462 filed on Mar. 26, 2010, and which claims priority to JP 2009-228757 filed on Sep. 30, 2009, and which are both herein incorporated by reference.

TECHNICAL FIELD

The present invention relates to a multi-piece oil ring which is used for an internal combustion engine. More concretely, the present invention relates to a multi-piece oil ring which is characterized in the shape of a sliding surface which is located at the edge of a sliding part protrusion and which slides on the engine cylinder.

BACKGROUND ART

Heretofore, a multi-piece oil ring has been used in the internal combustion engine, wherein the multi-piece oil ring comprises: an oil ring main member in which two rails are connected together by a columnar part and which has a roughly I-shaped cross section; and a coil expander which is placed in an inner circumferential groove formed on the inner circumferential surface of the columnar part of the oil ring main member, and which applies force to the oil ring main member in such a way as to press the same outwardly in the radial direction of the oil ring main member. With respect to such a multi-piece oil ring, it is required to reduce the oil consumption and to reduce the friction, and various developments has been made in order to reduce the oil consumption and to reduce the friction.

For instance, in the Patent Literature 1, the disclosed is an oil ring for the sake of reducing the oil consumption, in which each of the two rails of the oil ring main member has an individual sliding section protuberance, the tip of which forms an elevation.

PRIOR ARTS' LITERATURE

Patent Literature

Patent Literature 1: JP 2003-520931 A

SUMMARY OF THE INVENTION

Problems to be Solved by the Invention

Figure 1:
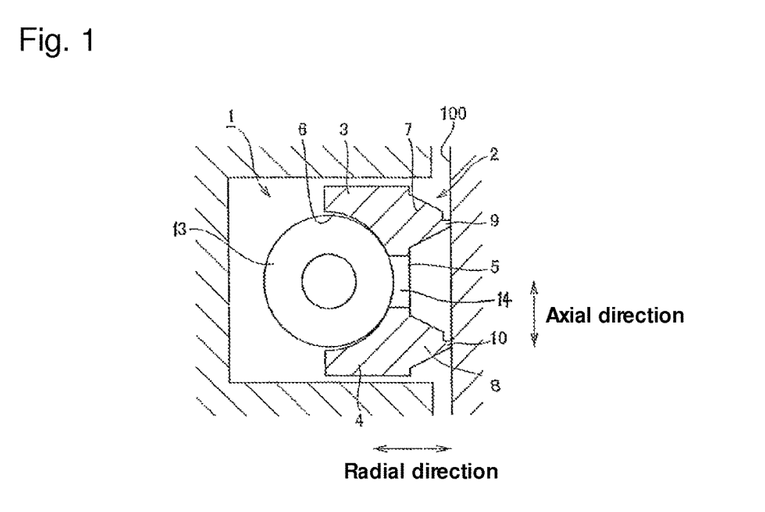
[FIG. 1] It is a schematic sectional view showing one embodiment of the multi-piece oil ring according to the present invention.

In the oil ring of the Patent Literature 1, however, there is no consideration about the case that the elevations formed at the tip of the sliding section protuberances were worn out after a long term usage of the oil ring. As shown in FIG. 1 appended to the Patent Literature 1, the elevations are designed so as to become larger in their surface area (i.e., area to slide on the cylinder) as the elevations are worn down. Although such a design may achieve a desired effect of reducing the oil consumption at the beginning of use, there is apprehension that the effect would be gradually degraded with time.

Further, the manufacturing method disclosed in the Patent Literature 1 is the one in which the entirety of the sliding section protuberance is shaped by polishing. Thus, in this manufacturing method, it is impossible to form each elevation which is provided on the tip of the individual sliding section protuberance with precision.

The present invention has been worked out in view of the above mentioned problems, and a main object of the present invention is to provide a multi-piece oil ring that is capable of reducing the oil consumption, that is capable of lessening the possibility of degradation of its performance for a long time of use, and that is capable of reducing the friction, so as to take one step ahead of the invention disclosed in the Patent Literature 1.

Means for Solving the Problems

The present invention for solving the above mentioned problems is embodied in a multi-piece oil ring which comprises: an oil ring main member in which two rails are connected together by a columnar part and which has a roughly I-shaped cross section; and a coil expander which is placed in an inner circumferential groove formed on the inner circumferential surface of the columnar part of the oil ring main member, and which applies force to the oil ring main member in such a way as to press the same outwardly in the radial direction of the oil ring main member; wherein the oil ring main member is made of steel, and wherein each of the two rails in the oil ring main member possesses an individual sliding section protuberance, the tip of which possesses a jutting portion formed by grinding a portion of the tip of the sliding section protuberance; wherein the axial length of the individual jutting portion is in the range of 0.02 to 0.18 mm; and wherein the change rate of the axial length of the individual jutting portion is in the range of 0 to 80% at least in a region of from its sliding surface to be faced to a cylinder, which is positioned at the tip of the jutting portion, to a position of 0.03 mm away from the aforementioned sliding surface in the radial direction of the oil ring main member.

In the present invention, the portion which underwent grinding may describe a curve in an axial cross-section in the region from the sliding surface to be faced to the cylinder, which is positioned at the tip of the jutting portion, to the position of 0.03 mm away from the aforementioned sliding surface in the radial direction of the oil ring main member.

In the present invention, each jutting portion may be located at the outer side of the individual sliding section protuberance which is formed on the individual rail.

In the present invention, each jutting portion may be located at the inner side of the individual sliding section protuberance which is formed on the individual rail.

In the present invention, one of the jutting portions may be located at the outer side of the corresponding sliding section protuberance which is formed on the corresponding rail, and another of the jutting portions may be located at the inner side of another sliding section protuberance which is formed on another rail.

In the present invention, the portion which underwent grinding may include a surface which is parallel to the sliding surface to be faced to a cylinder at the tip of the jutting portion.

In the present invention, the oil ring main member may be the one which underwent nitriding treatment.

In the present invention, a PVD coating and/or a DLC coating may be formed at least on the sliding surface to be faced to the cylinder, which is positioned at the tip of the jutting portion.

Effect of the Invention

In the multi-piece oil ring according to the present invention, since the jutting portions each having 0.02 to 0.18 mm in axial length are provided at the individual sliding section protuberances formed on two rails in the oil ring main member, by grinding portions of the sliding section protuberances, it is possible to reduce the sliding area of the oil ring main member which slides on an inner wall surface of a cylinder. Therefore, both of the reduction of friction and the reduction of oil consumption can be attained. In addition, since the jutting portions are formed by grinding the tips of the sliding section protuberances, it is possible to enhance dimensional precision of the jutting portions greatly.

Furthermore, in the multi-piece oil ring according to the present invention, since the change rate of the axial length of the individual jutting portion is set to be in the range of 0 to 80% at least in a region of from its sliding surface to be faced to a cylinder, which is positioned at the tip of the jutting portion, to a position of 0.03 mm away from the aforementioned sliding surface in the radial direction of the oil ring main member, the sliding area of the jutting portion which slides on the inner wall surface of the cylinder does not change (does not become greater) even if the jutting portion is worn down after a long time of use. Therefore, it is possible to provide the aforementioned effects invariably for a long time.

Regarding this point, it is possible to increase the grinding flexibility, and thus it becomes possible to improve further the processing precision and processing yield for the jutting portions, provided that the portion which underwent grinding describes a curve in an axial cross-section in the region of from its sliding surface to be faced to the cylinder, which is positioned at the tip of the jutting portion, to the position of 0.03 mm away from the aforementioned sliding surface in the radial direction of the oil ring main member.

In the multi-piece oil ring according to the present invention, when both of the jutting portions are located at the outer side of the individual sliding section protuberances which are formed on the two rails, or located at the inner side of the individual sliding section protuberances which are formed on the two rails, it is possible to give the oil ring main member a symmetrical configuration in axial direction. Therefore, it becomes possible to eliminate the necessity of considering the orientation of the oil ring when the oil ring is fitted to a piston, and thus, it becomes possible to save time and labor on the fitting.

On the other hand, when one portion which underwent grinding as mentioned above is located at the outer side of the corresponding sliding section protuberance of the lower side rail and another portion which underwent grinding similarly is located at the inner side of the corresponding sliding section protuberance of the upper side rail, it is possible to scrape off the oil efficiently, and thus it becomes possible to make a layer of oil thinner efficiently. Alternatively, when one portion which underwent grinding as mentioned above is located at the outer side of the corresponding sliding section protuberance of the upper side rail and another portion which underwent grinding similarly is located at the inner side of the corresponding sliding section protuberance of the lower side rail, the effects as mentioned above can be also attained.

In the multi-piece oil ring according to the present invention, when the portion which underwent grinding includes a surface which is parallel to the sliding surface to be faced to a cylinder at the tip of the jutting portion, it becomes possible to avoid the fear that any portions other than the jutting portion come into contact with the cylinder to the limit, even if the wear of the jutting portion progresses with a large extent.

In the multi-piece oil ring according to the present invention, when the oil ring main member is the one which underwent nitriding treatment, it is possible to improve the wear resistance and the strength of the oil ring.

In the multi-piece oil ring according to the present invention, when a PVD coating and/or a DLC coating is formed at least on the sliding surface to be faced to the cylinder, which is positioned at the tip of the jutting portion, it is possible to improve the wear resistance as is the case with the above mentioned nitriding treatment, and further, it is also possible to improve the sliding property of the oil ring.

EMBODIMENTS FOR CARRYING OUT THE INVENTION

Hereinafter, the multi-piece oil ring according to the present invention will be explained in detail with reference to drawings.

FIG. 1 is a schematic sectional view showing one embodiment of the multi-piece oil ring according to the present invention.

Figure 2:
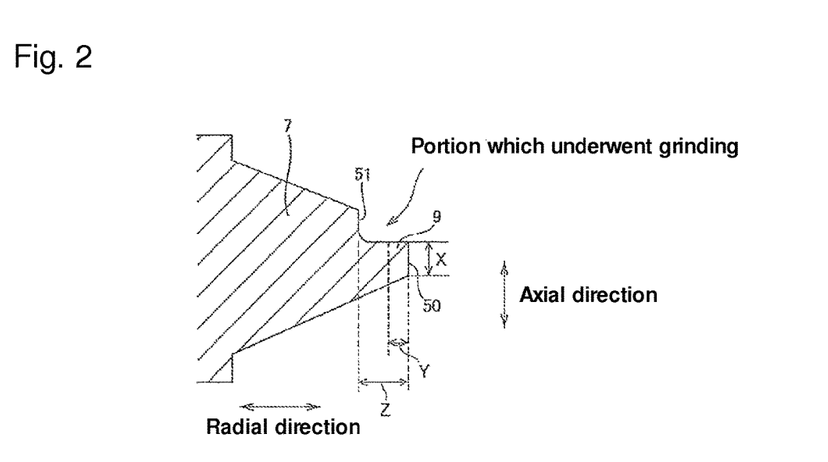
[FIG. 2] It is a magnified schematic sectional view showing a sliding section protuberance in the multi-piece oil ring illustrated in FIG. 1.

FIG. 2 is a magnified schematic sectional view showing a sliding section protuberance in the multi-piece oil ring illustrated in FIG. 1.

As illustrated in FIG. 1, a multi-piece oil ring 1 comprises an oil ring main member 2 and an expander 13. The oil ring main member 2 has a roughly I-shaped cross section, in which two rails 3, 4 are connected together by a columnar part 5. The coil expander 13 is placed in an inner circumferential groove 6 formed on the inner circumferential surface of the columnar part 5 of the oil ring main member 2, and the coil expander 13 applies force to the oil ring main member 2 in such a way as to press the oil ring main member 2 outwardly in the radial direction of the oil ring main member 2. Incidentally, the columnar part 5 of the multi-piece oil ring 1 shown in this figure is provided with an oil return hole 14.

As illustrated in FIG. 1 and FIG. 2, in the multi-piece oil ring according to the present invention, the two rails 3, 4 of the oil ring main member 2 possess individual sliding section protuberances 7, 8, and the tips of the sliding section protuberances 7, 8 possess individual jutting portions 9, 10 which are formed by grinding portions of the tips of the sliding section protuberances. The axial lengths X of the individual jutting portions 9, 10 are in the range of 0.02 to 0.18 mm.

When such jutting portions 9, 10 are formed, it is possible to reduce the sliding area in the oil ring main member 2, which slides on an inner wall surface 100 of a cylinder. Therefore, both of the reduction of friction and the reduction of oil consumption can be attained. In addition, since the jutting portions 9, 10 are formed by grinding the tips of the sliding section protuberances 7, 8, it is possible to enhance dimensional precision of the jutting portions 9, 10 greatly.

If the axial lengths X of the individual jutting portions 9, 10 are set to be less than 0.02 mm, the fear that the strength of the jutting portions 9, 10 deteriorate will arise, and further a possibility that the jutting portions 9, 10 chip will arise. Therefore, it is not preferable. On the other hand, if the axial lengths X of the individual jutting portions 9, 10 are set to be more than 0.18 mm, the sliding area of the jutting portions 9, 10 which slide on an inner wall surface 100 of a cylinder become larger, and thus, the friction and the oil consumption are forced to increase. Therefore, it is also not preferable. From these viewpoints, it is desirable that the aforementioned length X is set to be in the range of 0.05 to 0.17 mm.

As the processing method for forming the jutting portions 9, 10, it is possible to adapt any one or more of various grinding methods and various cutting methods properly. More concretely, for instance, it is preferable that a grindstone is dressed to an intended shape, and the rails of the piston ring are ground by using this dressed grindstone.

Further, the multi-piece oil ring according to the present invention is characterized in that the change rates of the axial lengths X of the individual jutting portions 9, 10 are in the range of 0 to 80% at least in a region Y (See, FIG. 2) of from their sliding surfaces 50 to be faced to a cylinder, which are positioned at the tips of the jutting portions 9, 10, to a position of 0.03 mm away from the aforementioned sliding surfaces in the radial direction of the oil ring main member.

Figure 3:
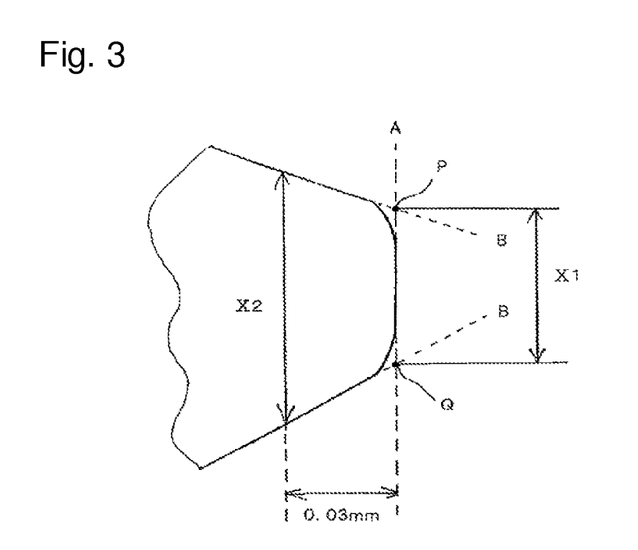
[FIG. 3] It is a magnified sectional view showing a sliding surface of a jutting portion which is to be faced to a cylinder, which is a feature of the present invention, and its neighboring area.

FIG. 3 is a magnified sectional view showing a sliding surface of the jutting portion 9 or 10 which is to be faced to a cylinder, which is a feature of the present invention, and its neighboring area.

As illustrated in FIG. 3, the words "the change rates of the axial length X of the jutting portion is in the range of 0 to 80% at least in a region from its sliding surface to be faced to a cylinder, which is positioned at the tip of the jutting portion, to a position of 0.03 mm away from the aforementioned sliding surface in the radial direction of the oil ring main member" used herein means that the value of (X2−X1)/X1 falls within the range of 0 to 0.80: wherein X1 denotes the axial length of the sliding surface to be faced to a cylinder, which is positioned at the tip of the jutting portion; and X2 denotes the axial length of the jutting portion at any given position within the range of from the sliding surface to the position of 0.03 mm away from the aforementioned sliding surface in the radial direction of the oil ring main member. (In FIG. 3, as the given position, a position which is 0.03 mm away from the sliding surface is illustrated.).

Further, as illustrated in FIG. 3, the actual configuration of the jutting portion in the present invention may be rounded to a certain degree. In such a case, the dimension of X1 is defined as the dimension between intersection points P and Q, at which an extension line (A) of the sliding surface in the axial direction and extension lines (B) of the side surfaces of the jutting portion are intersected individually. Incidentally, it is preferable to verify the configuration of the jutting portion by determining profile of the jutting portion with a contour measuring instrument or the like.

As described above, when the change rate of the axial length of the individual jutting portion is set to be in the range of 0 to 80%, at least in a region between the sliding surface that faces a cylinder positioned at the tip of the jutting portion, to a position of 0.03 mm away from the aforementioned sliding surface in the radial direction of the oil ring main member, the sliding area (area of the region designated by the symbol X) of each of the jutting portions 9, 10 which slides on the inner wall surface 100 of the cylinder does not change (does not become greater) even if the jutting portions 9, 10 are worn down after along time of use. Therefore, it is possible to provide the aforementioned effects invariably for a long time.

Herein, with respect to the length Z in the radial direction of the jutting portions 9, 10 (See, FIG. 2), there is no particular limitation in the present invention on condition that the length Z is at least 0.03 mm or more. Nevertheless, it is practical, down-to-earth to set it to be not more than 0.10 mm, and further it is more preferable to set is to be not more than 0.05 mm, in consideration of easy processing of the jutting portions 9, 10 and the size of the oil ring main member as a whole.

In addition, on the grinding process for forming the jutting portion 9 (or 10), it is preferable to grind the prescribed portion of the rail so as to form a surface 51 which is parallel to the sliding surface 50 which is to be faced to a cylinder and exists at the tip of the jutting portion 9 (or 10). Because, in the case that the portion which underwent grinding is allowed to be parallel to the sliding surface 50 to be faced to a cylinder at the tip of the jutting portion in this way, it becomes possible to avoid the fear that any portions other than the jutting portion 9 (or 10) come into contact with the cylinder to the limit, even if the wear of the jutting portion 9 (or 10) progresses with a large extent. With respect to the grinding process for preparing such a surface 51, there is no particular limitation in the present invention, for instance, it is possible to adapt any one of the aforementioned methods. Alternatively, this can be also accomplished by designing appropriately the shape of a tool to be used for the grinding process.

With respect to the axial length (dimension: h1) of the oil ring main member 2 in the multi-piece oil ring according to the present invention, although there is no particular limitation about it and it may be designed appropriately, it is preferable, for instance, to set it to be in the range of 1.5 mm to 4.0 mm, and more desirably, in the range of 1.5 mm to 2.5 mm.

With respect to the material for the oil ring main member 2, although there is also no particular limitation about it and it may be selected appropriately, it is preferable, for instance, that the oil ring main member is made of steel, and more desirably, it is made of 8Cr type steel, SUS410J1 equivalent steel, SWRH77B equivalent steel, or SUS404B equivalent steel.

Other Embodiment 1

Figure 4A:
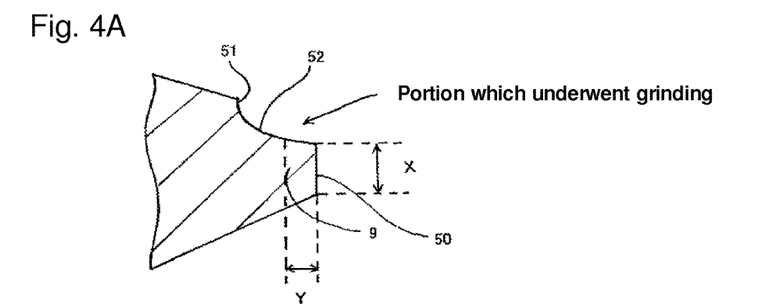
[FIG. 4] They are magnified sectional views each showing a jutting portion formed on an oil ring main member which constitutes the multi-piece oil ring according to the present invention.
Figure 4B:
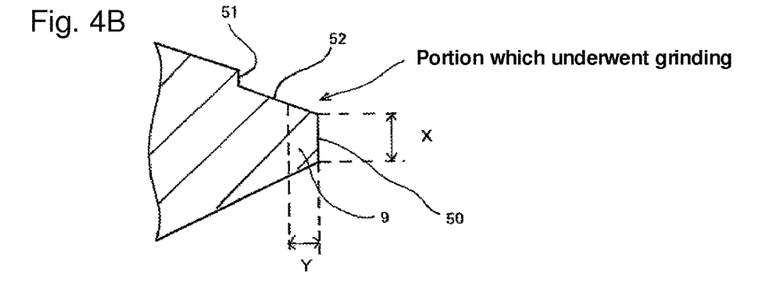
Figure 4C:
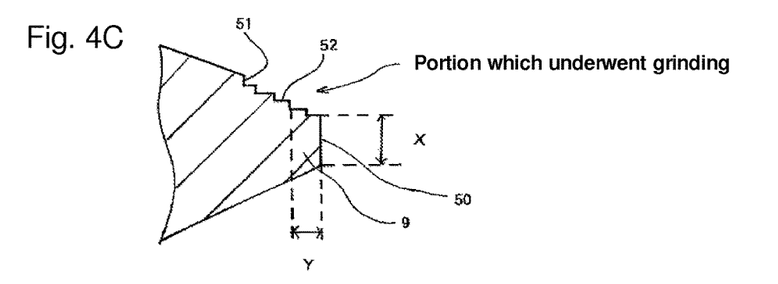

FIGS. 4A-4C are magnified sectional views, each view showing a jutting portion formed on an oil ring main member which constitutes the multi-piece oil ring according to the present invention.

In FIG. 1 and FIG. 2, the axial sections of the portions which underwent grinding, in a region Y of from their sliding surfaces 50 to be faced to a cylinder, which are positioned at the tips of the jutting portions 9, 10, to a position of 0.03 mm away from the aforementioned sliding surfaces in the radial direction of the oil ring main member, are set to be perpendicular to the sliding surfaces 50. However, the present invention is not limited to such an embodiment, and it can take any various embodiments as shown in FIGS. 4A-4C, for instance.

Concretely, as shown in FIG. 4A, the axial section 52 of the portion which underwent grinding, in the region Y between the sliding surface 50 that faces a cylinder positioned at the tip of the jutting portion 9, to a position of 0.03 mm away from the aforementioned sliding surface in the radial direction of the oil ring main member, may describe a curve, namely, may have a curvature.

Alternatively, as shown in FIG. 4B, the axial section 52 of the portion which underwent grinding, in the region Y of from their sliding surfaces 50 to be faced to a cylinder, which are positioned at the tip of the jutting portion 9, to a position of 0.03 mm away from the aforementioned sliding surface in the radial direction of the oil ring main member, may describe an oblique line.

As further another option, as shown in FIG. 4C, the axial section 52 of the portion which underwent grinding, in the region Y of from their sliding surfaces 50 to be faced to a cylinder, which are positioned at the tip of the jutting portion 9, to a position of 0.03 mm away from the aforementioned sliding surface in the radial direction of the oil ring main member, may describe a stepped edge.

To sum up, the necessitated thing for the present invention is only that the change rate of the axial length X of the jutting portion 9 is in the range of 0 to 80% in the prescribed region (the region Y of from its sliding surface 50 to be faced to a cylinder, which is positioned at the tip of the jutting portion 9, to a position of 0.03 mm away from the aforementioned sliding surface in the radial direction of the oil ring main member), and therefore, as far as this change rate can be attained, there is no particular limitation with respect to the sectional configuration of the portion 52 which underwent grinding.

Nevertheless, among the various configurations shown in FIGS. 4A-4C, it is particularly preferable to form the axial section 52 of the portion which underwent grinding so as to describe a curve as illustrated in FIG. 4A. When allowing the portion to form such a configuration, it becomes possible to use a grindstone for grinding this portion, and it becomes also possible to give a certain margin to the precision of the grindstone to be used. As the results, it becomes possible to increase the grinding flexibility, and thus it becomes possible to improve further the processing precision and processing yield for the jutting portion. In the cases of the configurations illustrated in FIG. 4B and FIG. 4C, there is a fear that both of them are inferior to the case of FIG. 4A with respect to the processing precision.

Other Embodiment 2

Figure 5A:
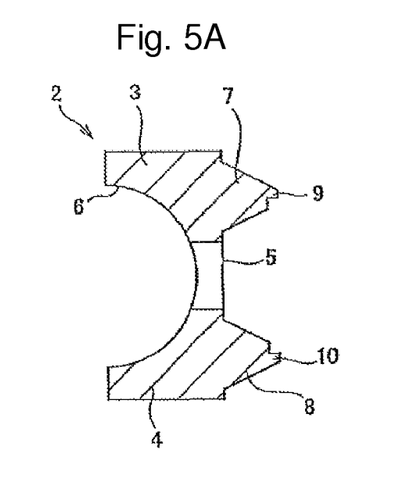
[FIG. 5] They are schematic sectional views each showing an oil ring main member which constitutes the multi-piece oil ring according to the present invention.
Figure 5B:
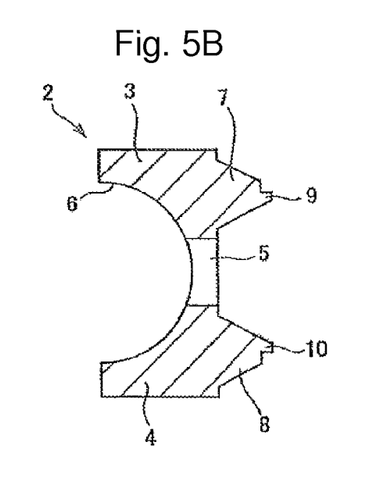
Figure 5C:
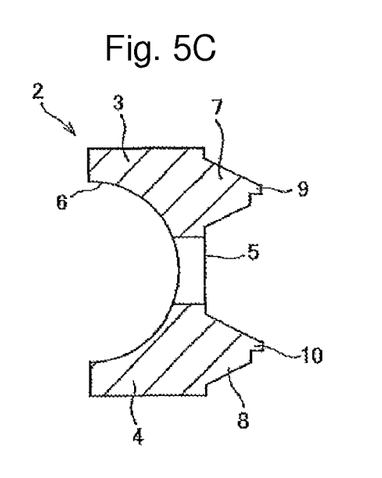

FIGS. 5A-5C are schematic sectional views each showing an oil ring main member which constitutes the multi-piece oil ring according to the present invention.

In FIG. 1, the jutting portions 9, 10 are provided so that one of them is located at the "inner side" (with respect to the numeral 9), and the other is at the "outer side" (with respect to the numeral 10), of the individual sliding section protuberances 7, 8 which are formed on the two rails 3, 4. However, the present invention is not limited to such a layout with respect to the locations of the jutting portions 9, 10. For instance, as illustrated in FIG. 5A, it is possible to adopt a layout where both of the jutting portions 9, 10 are located at the "outer side" of the individual sliding section protuberances 7, 8 which are formed on the two rails 3, 4; or as illustrated in FIG. 5B, it is possible to adopt a layout where both of the jutting portions 9, 10 are located at the "inner side" of the individual sliding section protuberances 7, 8 which are formed on the two rails 3, 4; or as illustrated in FIG. 5C, it is possible to adopt a layout where one of them is located at the "outer side" of the sliding section protuberances 7 which is formed on one rail 3, and the other is at the "inner side" of the sliding section protuberance 8 which is formed on the other rail 4.

(Manufacturing Method)

Next, an embodiment of the method for manufacturing the oil ring main member which constitutes the multi-piece oil ring according to the present invention will be described.

First, in accordance with the conventionally known procedure, wire material for piston ring undergoes a winding step, a cutting-off step, a gas nitriding step, a finish polishing step of outer circumferential surface, and a grinding step of width surface in order to form an oil ring main member.

Then, portions of the tips of the sliding section protuberances in the oil ring main member undergo grinding by means of a dressed grindstone, in order to form the jutting portions which are a feature of the present invention.

Subsequently, the outer circumferential surfaces of the thus formed jutting portions undergo buffing in order to make the surfaces smooth. Thereby, it become possible to prevent the edges of the jutting portions from chipping, and to improve adhesion of a PVD coating which is formed on the jutting portion by a PVD treatment following this buffing.

Next, at least the sliding surface to be faced to the cylinder, which is positioned at the tip of the jutting portion undergoes PVD treatment and/or DLC coating treatment as hardening surface treatments in order to form a PVD coating and/or a DLC coating onto the sliding surface.

After that, surface roughness and contacting width of the rails are controlled by performing lapping. Incidentally, the aforementioned buffing process and the lapping process may be chosen appropriately, in such a manner that either of them is omitted or further added, in accordance with the desired surface properties of the ring to be obtained.

In addition, as the finishing step, the upper and lower surfaces of the oil ring main member undergo grinding again in order to adjust finally the dimension in the axial direction (dimension: h1) of the oil ring main member.

FIGS. 6A-6G are schematic sectional views each showing a concrete embodiment of the oil ring main member which constitutes the multi-piece oil ring according to the present invention.

Figure 6A:
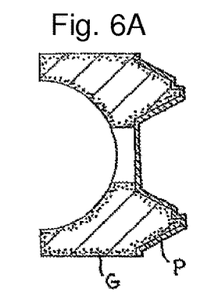
[FIG. 6] They are schematic sectional views each showing a concrete embodiment of the oil ring main member which constitutes the multi-piece oil ring according to the present invention.

For instance, as illustrated in FIG. 6A, it is possible to form a PVD coating layer P on the outer circumferential surface of the oil ring main member, while a gas nitrided layer G is formed on the whole circumferential surface of the oil ring main member.

Figure 6B:
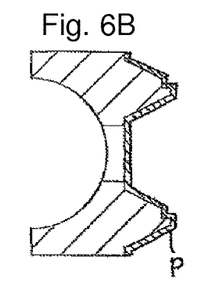

Alternatively, as illustrated in FIG. 6B, it is possible to form a PVD coating film P on the outer circumferential surface of the oil ring main member, while a gas nitrided layer G is omitted.

Figure 6C:
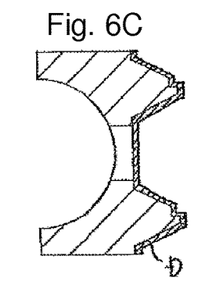

As another alterative way, as illustrated in FIG. 6C, it is possible to form a DLC coating film D on the outer circumferential surface of the oil ring main member, while a gas nitrided layer G is omitted.

Figure 6D:
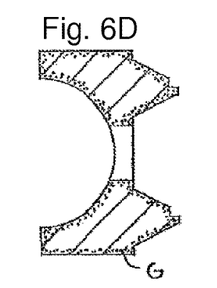

As a different alterative way, as illustrated in FIG. 6D, it is possible to form merely a gas nitrided layer G on the whole circumferential surface of the oil ring main member.

Figure 6E:
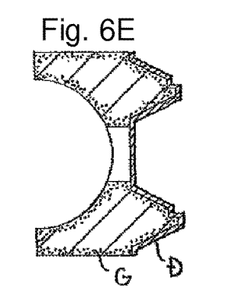

As a further another alterative way, as illustrated in FIG. 6E, it is possible to form a DLC coating film D on the outer circumferential surface of the oil ring main member, while a gas nitrided layer G is formed on the whole circumferential surface of the oil ring main member.

Figure 6F:
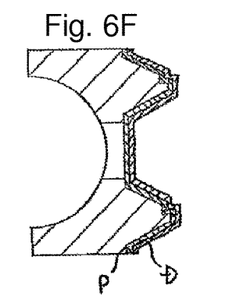

As a still another alterative way, as illustrated in FIG. 6F, it is possible to form a PVD coating film P on the outer circumferential surface of the oil ring main member and form further a DLC coating film D thereon.

Figure 6G:
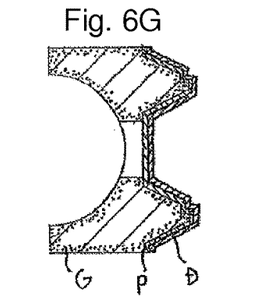

As a yet another alternative way, as illustrated in FIG. 6G, it is possible to form a PVD coating film P on the outer circumferential surface of the oil ring main member and form further a DLC coating film D thereon, while a gas nitrided layer G is formed on the whole circumferential surface of the oil ring main member.

The present invention is neither limited to the above-mentioned manufacturing method nor limited to oil ring main members illustrated in FIG. 6. However, as illustrated in FIG. 6, with respect to the portions which underwent grinding for forming the jutting portions, it is possible to provide a gas nitrided layer and a PVD coating film onto the portions in addition. Further, when using an appropriate mask, it is also possible to provide a gas nitrided layer and a PVD coating film only onto the sliding section protuberances, or more restrictively, only onto the tips of the sliding section protuberances. In addition, as illustrated in FIG. 6, in the present invention, it is possible to provide the gas nitrided layer alone, while it is also possible to provide the PVD coating film or the DLC coating film alone.

EXAMPLES

Example 1

A multi-piece oil ring of Example 1 according to the present invention was manufactured so as to possess the configuration illustrated in FIG. 5A, i.e., the configuration where both of the jutting portions 9, 10 were located at the "outer side" of the individual sliding section protuberances 7, 8 which were formed on the two rails 3, 4.

Herein, the axial length X of each sliding surface to be faced to a cylinder, which was positioned at the tip of the individual jutting portions of the oil ring of Example 1 was 0.123 mm, and the change rate of the axial length of the individual jutting portion in a region of from the sliding surface to a position of 0.03 mm away from the aforementioned sliding surface in the radial direction of the oil ring was 67%.

The quality of the material of the oil ring of Example 1 was equivalent to SUS410J normal material according to Japanese Industrial Standards (JIS). The total width in the axial direction of the oil ring (dimension: h1) was 4.0 mm. With respect to the width in the radial direction of the oil ring (dimension: a1), it was 2.35 mm when determining the oil ring main member alone, and it was 4.35 mm when determining the oil ring main member in combination with the coil expander.

On the preparation of the oil ring of Example 1, the aforementioned material underwent gas nitriding (to form a nitrided layer of HV700 or more with 100-150 μm in thickness), and then the treated material underwent lapping, and grinding in order to give the shape as illustrated in FIG. 5A.

Example 2

A multi-piece oil ring of Example 2 according to the present invention was manufactured so as to possess the configuration illustrated in FIG. 5B, i.e., the configuration where both of the jutting portions 9, 10 were located at the "inner side" of the individual sliding section protuberances 7, 8 which were formed on the two rails 3, 4, in a similar fashion to Example 1.

Dimensions of the oil ring of Example 2 were the ones as shown in the following Table 1, respectively. With respect to the things which were not mentioned in Table 1, they were the same as in the case of Example 1.

Example 3

A multi-piece oil ring of Example 3 according to the present invention was manufactured so as to possess a configuration which turned the configuration illustrated in FIG. 5C upside down (the configuration corresponding to FIG. 1), i.e., the configuration where one of the jutting portions 9, 10 was located at the "inner side" of the sliding section protuberances 7 which was formed on the upper rail 3, and the other was at the "outer side" of the sliding section protuberance 8 which was formed on the lower rail 4, in a similar fashion to Example 1.

Dimensions of the oil ring of Example 3 were the ones as shown in the following Table 1, respectively. With respect to the things which were not mentioned in Table 1, they were the same as in the case of Example 1.

Example 4

A multi-piece oil ring of Example 4 according to the present invention was manufactured so as to possess the configuration illustrated in FIG. 5C, i.e., the configuration where one of the jutting portions 9, 10 was located at the "outer side" of the sliding section protuberances 7 which was formed on the upper rail 3, and the other was at the "inner side" of the sliding section protuberance 8 which was formed on the lower rail 4, in a similar fashion to Example 1.

Dimensions of the oil ring of Example 4 were the ones as shown in the following Table 1, respectively. With respect to the things which were not mentioned in Table 1, they were the same as in the case of Example 1.

Comparative Example 1

Figure 7:
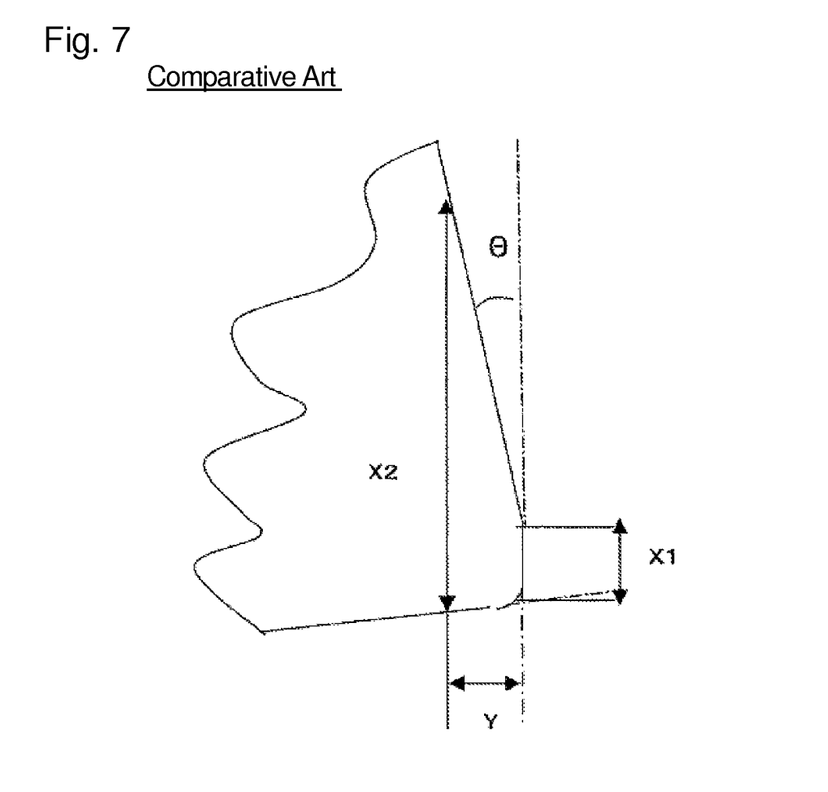
[FIG. 7] it is a magnified sectional view showing a jutting portion formed on an oil ring main member which constitutes a multi-piece oil ring of a comparative example.

A multi-piece oil ring of Comparative Example 1 was manufactured so as to possess the configuration illustrated in FIG. 7, i.e., the configuration where one of the jutting portions 9, 10 was located at the "inner side" of the sliding section protuberances 7 which was formed on the upper rail 3, and the other was at the "outer side" of the sliding section protuberance 8 which was formed on the lower rail 4, and wherein the change rate of the axial length of each jutting portion in a region of from individual sliding surface to be faced to a cylinder, which was positioned at the tip of the individual jutting portion, to a position of 0.03 mm away from the aforementioned sliding surface in the radial direction of the oil ring was 500%. In the configuration illustrated in FIG. 7, a tapered surface was provided at upper region of the sliding surface where substantially no jutting portion appeared, and the degree of symbol 8 in FIG. 7 was 2°.

Dimensions of the oil ring of Comparative Example 1 were the ones as shown in the following Table 1, respectively. With respect to the things which were not mentioned in Table 1, they were the same as in the case of Example 1.

Conventional Example 1

An oil ring of Conventional Example 1 where no jutting portion was provided was manufactured. Dimensions of the oil ring of Conventional Example 1 were the ones as shown in the following Table 1, respectively. With respect to the things which were not mentioned in Table 1, they were the same as in the case of Example 1.

<Actual Road Test>

Multi-piece oil rings of Examples 1-4, Comparative Example 1 and Conventional Example 1 were installed individually in a four-cylinder straight diesel engine having an engine displacement of 8000 cc, and each bore diameter of 115 mm, together with a first compression ring and a second compression ring, in order to subject the oil rings to actual road test.

Specifically, the engine was operated by WOT, Wide Open Throttle (full road), at engine speed of 2200 rpm, and lubricant oil consumption (LOC) for the individual oil rings of Examples 1-4 and Comparative Example 1 were evaluated, and the obtained values of them were expressed as index numbers, provided that the value of LOC upon using the oil ring of Conventional Example 1 is set to be 100, and the values of LOC of Examples 1-4 and Comparative Example 1 were compared with the one of Conventional Example 1.

Further, tensions of the oil rings of Examples 1-4 and Comparative Example 1 were expressed as index numbers, provided that the value of tension of the oil ring of Conventional Example 1 is set to be 100, and the values of tensions of Examples 1-4 and Comparative Example 1 were compared with the one of Conventional Example 1.

In addition, the evaluation of frictions were made by calculating from the initial sliding surfaces (axial lengths of the sliding surfaces), the sliding surfaces when the oil rings underwent a change up to the position of 0.03 mm in the radial direction, and tensions. Herein, the case of attaining a descent of not less than 5% as compared with the data of Conventional Example 1 was judged as the evaluation criterion ○, and the case of being a descent of less than 5% was judged as the evaluation criterion x.

The results of the actual road test are shown in the following Table 1.

Incidentally, the material of the first compression ring used was comprised of C: 0.9%, Si: 0.4%, Mn: 0.3%, Cr: 17.50%, Mo: 1.1%, V: 0.1%, P: 0.01%, S: 0.01%, and the balance: Fe and inevitable impurities, on the basis of mass ratio (it was equivalent to SUS 440B material according to Japanese Industrial Standards (JIS).), and the used first compression ring possessed 3.0 mm in the width in the axial direction of ring (dimension: h1), and 3.95 mm in the width in the radial direction of ring (dimension: a1). Further, the outer circumferential sliding surface of the first compression ring was provided with a Cr—B—N based ion-plating coating film.

On the other hand, the material of the second compression ring used was equivalent to 10Cr steel material, and the used second compression ring possessed 2.5 mm in the width in the axial direction of ring (dimension: h1), and 4.3 mm in the width in the radial direction of ring (dimension: a1).

Further, with respect to the first compression ring, the outer circumferential sliding surface thereof were shaped as a barrel face configuration, while the outer circumferential sliding surface of the second compression ring were shaped as a tapered configuration.

TABLE 1

|  | Example 1 | Example 2 | Example 3 | Example 4 | Comparative Example 1 | Conventional Example 1 |
| --- | --- | --- | --- | --- | --- | --- |
| Configuration | FIG. 5A | FIG. 5B | FIG. 1 | FIG. 5C | FIG. 5C | Without jutting portion |
| Axial length of jutting portion | 0.123 | 0.138 | 0.154 | 0.131 | 0.05 | 0.26 |
| Change amount at the 0.03 mm position (%) | 67 | 58 | 60 | 60 | 500 | 10 |
| Index number of LOC | 105 | 104 | 95 | 98 | 100 | 100 |
| Index number of tension | 45 | 54 | 60 | 43 | 70 | 100 |
| Evaluation of friction | ○ | ○ | ○ | ○ | X | — |

As is evident from Table 1, when comparing data of Example 1-4 with those of Conventional Example 1 with respective to the index number of LOC and the evaluation of friction, it is found that the each individual index number of LOC obtained in Examples 1-4 lies within the range of plus or minus 5% of the index number of Conventional Example 1, in other words, it is substantially equivalent to the index number of Conventional Example 1. On the other hand, each of Examples 1-4 can attain 5% or more (5%-30%) of reduction in the friction as compared with Conventional Example 1. When comparing data of Example 1-4 with datum of Comparative Example 1 with respective to the index number of LOC, it is found that they are substantially equivalent to each other. However, when comparing data of Example 1-4 with datum of Comparative Example 1 with respective to the index number of friction, it is found that the amount of change at the position of 0.03 mm (Y) in the radial direction as to Comparative Example 1 is 500% (five times) of the initial contact, although the contact at the initial sliding operation is 0.05 mm. On the other hand, it is found that the data of the amount of change at the position of 0.03 mm (Y) in the radial direction as to Examples 1-4 are in the range of 58%-67%, that is, in the range of not more than 80%. In addition, the evaluations of friction as to Examples 1-4 are rated as good in all cases, since the change of sliding surface of Examples 1-4 is smaller than that of Comparative Example 1. On the other hand, an evaluation of friction as to Comparative Example 1 is rated as bad, since the change of sliding surface of Comparative Example 1 is large. Further, when considering the relation between the position of the jutting portion of the sliding surface and the individual data, it is found that the values of index number of LOC are not substantially affected by the variance of the position of the jutting portion, and are about the same. Furthermore, with respect to Examples 1-4, a 5% or more of reduction in the friction can be obtained as compared with Conventional Example 1.

DESCRIPTION OF NUMERALS

1—multi-piece oil ring
2—oil ring main member
3, 4—rail
5—columnar part
6—inner circumferential groove
7, 8—sliding section protuberance
9, 10—jutting portion
X—axial length of jutting portion
Y—region of from a sliding surface to be faced to a cylinder, which is positioned at the tip of a jutting portion, to a position of 0.03 mm away from the sliding surfaces in the radial direction of oil ring main member
Z—radial length of jutting portion
50—sliding surface to be faced to a cylinder, which is positioned at the tip of a jutting portion
100—inner wall surface of a cylinder
G—gas nitrided layer
P—PVD coating film
D—DLC coating film

The invention claimed is:

1. A multi-piece oil ring comprising:
    an oil ring main member in which two rails arranged in an axial direction are connected together by a columnar part and which has a roughly I-shaped axial cross section; and
    a coil expander which is placed in an inner circumferential groove formed on an inner circumferential surface of the columnar part of the oil ring main member, and which applies force to the oil ring main member in such a way as to press the same outwardly in a radial direction of the oil ring main member,
    wherein each of the two rails in the oil ring main member comprises an individual protuberance extending from a top surface of the rail outwardly in the radial direction, the protuberance having a first portion and a second portion respectively,
        the first portion being formed at a tip of the protuberance as a jutting portion with a sliding surface configured to engage with an associated piston cylinder, a first surface having a taper shape, a second surface having a concave shape, and a third surface which is parallel to the sliding surface and is formed between the second portion and the second surface,
        the second portion being formed between the first portion and the top surface of the rail, and having a taper shape that tapers off towards the sliding surface, the second portion having a first side and a second side opposite from the first side arranged along the axial direction,
        the first side of the second portion being formed by continuously linearly connecting to the first surface and by tapering off from the top surface of the rail to the first surface, and
        the second side of the second portion being formed by connecting to the second surface of the first portion via the third surface of the first portion and by continuously linearly tapering off from the top surface of the rail to the third surface;
    wherein the second surface of the first portion is formed at either an outer side of the sliding surface or at an inner side of the sliding surface in the axial direction of the protuberance facing towards or away from the other protuberance, the second surface of the first portion continuously tapers off from the third surface of the first portion to the sliding surface and forms a concavity in axial cross section and in the direction towards the first surface of the first portion, the concavity of the second surface of the first portion connects to the second side of the second portion via the third surface of the first portion.

2. The multi-piece oil ring according to claim 1, wherein at least one of the second surfaces faces away from the other protuberance.

3. The multi-piece oil ring according to claim 1, wherein at least one of the second surfaces faces towards the other protuberance.

4. The multi-piece oil ring according to claim 1, wherein one of the second surfaces faces away from the other protuberance, and another of the second surfaces faces towards the other protuberance.

5. The multi-piece oil ring according to claim 1, wherein the oil ring main member has undergone a nitriding treatment.

6. The multi-piece oil ring according to claim 1, further comprising a physical vapor deposition (PVD) coating and/or a diamond-like carbon (DLC) coating formed on each of the sliding surfaces.

7. The multi-piece oil ring according to claim 1, wherein the axial length of each individual jutting portion is in the range of 0.05 to 0.17 mm.

8. The multi-piece oil ring according to claim 1, wherein each individual first portion has a length in the radial direction in the range of 0.03 to 0.10 mm.

9. The multi-piece oil ring according to claim 1, wherein the oil ring main member is made of a member selected from the group consisting of: 8Cr type steel, SUS410J1 equivalent steel, SWRH77B equivalent steel, and SUS404B equivalent steel.

* * * * *